July 2, 1935.    J. DE MOOY    2,006,885
HOSE COUPLING
Filed June 18, 1934

JOHN DE MOOY
INVENTOR

BY *John V. Renfer*

ATTORNEY

Patented July 2, 1935

2,006,885

UNITED STATES PATENT OFFICE 2,006,885

HOSE COUPLING

John De Mooy, Shaker Heights, Ohio, assignor to The Cleveland Pneumatic Tool Company, Cleveland, Ohio, a corporation of Ohio Application June 18, 1934, Serial No. 731,069

6 Claims. (Cl. 29—88.2)

This invention relates broadly to hose coupling but more particularly to an improvement in the construction of the coupling disclosed in Letters Patent No. 1,093,528 issued April 14, 1914.

One object of this invention is to construct the male member of the coupling in a manner facilitating the assembly of the parts thereof.

Another object of this invention is to materially reduce the overall length of the male member of a coupling, without reducing the wearing and engaging surfaces of the member.

Other objects and advantages more or less ancillary to the foregoing reside in the specific construction and aggroupment of the elements peculiar to this structure, as will become apparent from a more complete examination of this specification.

In the drawing:—

Figure 1:
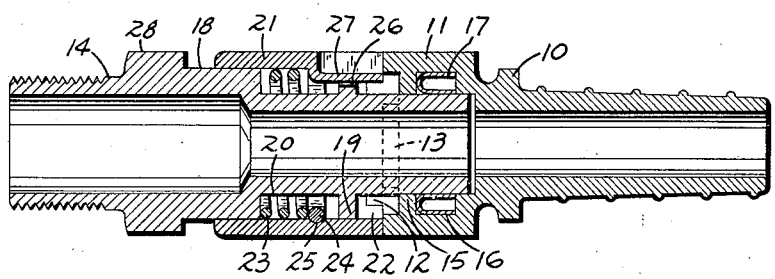
Fig. 1 is a longitudinal cross sectional view of the coupling assembly.
Figure 2:
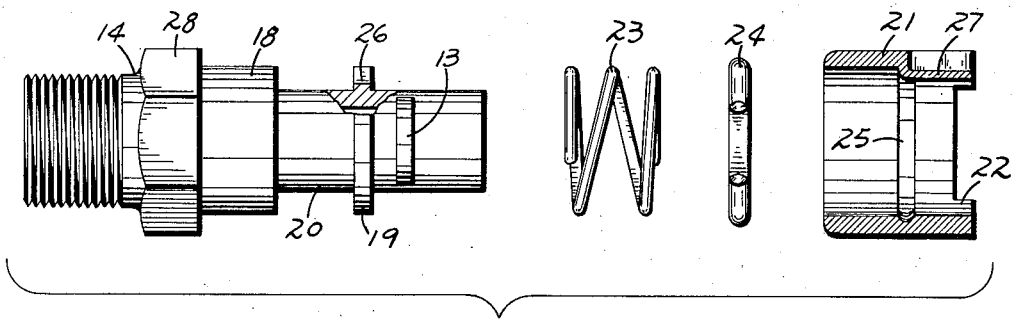
Fig. 2 is a view of the different parts constituting the male member of the coupling, shown in the order of their insertion over the male member.
Figure 3:
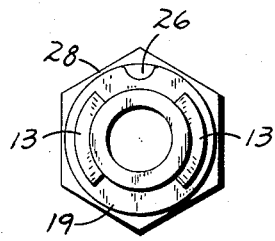
Fig. 3 is an end view of the male member shown in Fig. 2.
Figure 4:
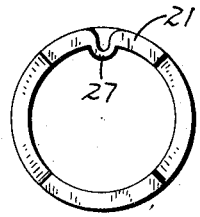
Fig. 4 is an end view of the sleeve shown in Fig. 2.

Referring to the drawing in which like symbols designate corresponding parts throughout the several views, 10 designates the female member of the coupling having an enlarged head 11 provided at diametrically opposite points with inwardly projecting substantially quadrant shaped flanges 12 adapted to receive similar lugs 13 formed on the male member 14. The lugs 13 are insertable behind the flanges 12 for locking engagement therewith against the separation of the members of the coupling. At a suitable distance in rear of the flanges 12, the female member is formed with an annular internal flange 15 forming an abutment wall for limiting the penetration of the lugs 13 in the female member 10. This annular internal flange 15 also serves as a wall to a pocket 16 provided rearwardly thereof and into which is fitted a substantially U-shaped gasket or washer 17, the latter serving to prevent leakage when the female member 10 receives the male member 14.

The male member 14 is provided on its exterior with the segmental lugs 13 previously mentioned, which are a little less than a quadrant to permit of their ready insertion between the annular flange 15 and the opposed flanges 12 of the head. In spaced relation with the lugs 13, the member 14 is provided with annular shoulders 18 and 19 respectively, providing an annular recess 20 therebetween. Mounted on said shoulders for longitudinal movement there is a locking sleeve or ring 21 provided with extensions 22 adapted to engage the side wall of the flanges 12 in the head 11 to secure the members of the coupling against relative rotary movement, and thereby lock them against accidental uncoupling.

Located within the recess 20 of the male member 14, is a compression spring 23 having one end resting against the shoulder 18, while the other end is adapted to rest against a split snap ring 24 adapted to snap for locking engagement in an annular grooves 25, formed in the inner surface of the locking sleeve or ring 21. In this manner the spring 23 is properly seated against both the ring 24 and the shoulder 18 so that the tension of the spring will be exerted against the sleeve 21 for automatically shifting and maintaining it in locking position.

The construction heretofore recited being identical to the construction illustrated and specified in the previously mentioned patent, no further explanation of the same is thought necessary.

Referring now more particularly to the present invention, the shoulder 19 of the male member 14 is formed with a longitudinally disposed guide channel or groove 26, while one of the extensions 22 of the sleeve 21 is instruck to provide a guide rib or projection 27 which is correspondingly shaped to the groove or channel 26 for engagement therein to prevent the relative rotation of the sleeve on the member 14, yet permitting it to freely slide longitudinally thereon against the resistance of the spring 23.

In assembling the different parts of the male member, the spring 23 is first introduced within the recess 20 by screwing the former over the shoulder 19 via the channel or groove 26. Subsequently the snap ring 24 is introduced within the recess 20 in the same manner. After the spring and ring are thus located within the recess, the sleeve 21 is introduced from the unthreaded end of the member 14 over the shoulders 19 and 18, with the projection 27 located in the channel 26. The sleeve is then pushed toward the screw threaded end of the member until the split ring 24 snaps into the annular recess 25 provided in the inner surface of the sleeve. In this manner, it will be seen that when the male member is formed with a hexagonally shaped portion similar to 28, the distance between that portion and the adjacent end of the sleeve 21 need not be greater than the normal travel of the sleeve which is necessary to disengage the extension 22 of the sleeve with the side walls of the flanges 12 formed on the female member, thus reducing the length of the male member and facilitating the assembly of the parts thereon.

It will be understood that there may be modification of the device without departure from the invention.

I claim:

1. The method of assembling the male member of a coupling having an enlarged and a reduced end portion, which consists of introducing from one end of said member a compression spring and a snap ring in an external annular recess provided on said male member, and subsequently introducing from said one end a sleeve over the small end portion of said member and sliding said sleeve over said compression spring and snap ring until the latter snaps in an internal annular recess provided within said sleeve.

2. The method of assembling the male member of a coupling having one end portion carrying lugs engageable with the female member of the coupling, which consists of introducing a compression spring and a snap ring in an external annular recess provided on said male member, and subsequently introducing said one end portion within a sleeve and sliding the sleeve over said compression spring and snap ring until the latter snaps in an internal annular recess provided within said sleeve.

3. The method of assembling the male member of a coupling having one end portion thereof carrying lugs engageable with the female member of the coupling, which consists of introducing a compression spring and a snap ring over said one end portion and into an external annular recess provided on said member, and subsequently introducing said one end portion, snap ring and compression spring within a sleeve until said snap ring snaps in an internal annular recess formed within the inner wall of said sleeve.

4. The method of assembling the male member of a coupling having one end portion thereof engageable with a packing located within the female portion of the coupling, which consists of introducing a compression spring and an annular split element within an external annular recess provided on said member, subsequently introducing said one end portion of the member within a sleeve having its internal diameter somewhat smaller than the external diameter of said split element, and subsequently pushing said sleeve over said split element to cause the contraction thereof and sliding the sleeve thereover until said split element snaps in an internal annular recess formed within the inner wall of said sleeve.

5. The method of assembling the male member of a coupling having one end portion thereof engageable with a packing located within the female portion of the coupling, which consists of introducing a compression spring in an annular recess provided on said member by starting the spring in a groove longitudinally disposed within one annular flange constituting one side wall of said annular recess and screwing the spring thereover via said groove, subsequently introducing into said recess an annular split element and introducing said one end portion of said member within a sleeve having its internal diameter somewhat smaller than the external diameter of said split ring, and subsequently pushing said sleeve over said split element to cause the contraction thereof and sliding the sleeve thereover until said split element snaps in an internal annular recess formed within the inner wall of said sleeve.

6. The method of assembling a tubular coupling member, which consists of introducing from one end of said member a resilient annular element in an external annular recess provided on said member, and subsequently introducing from the same end of said member a sleeve over said element and sliding the former over the latter until the latter snaps in an internal annular recess provided within said sleeve.

JOHN DE MOOY.